Figure 3:
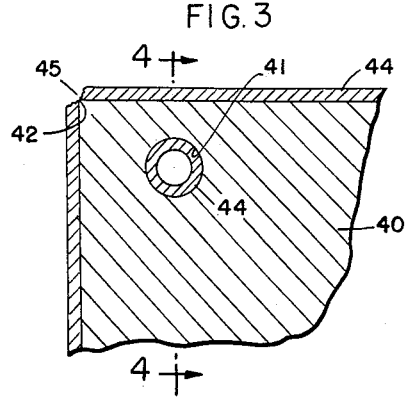

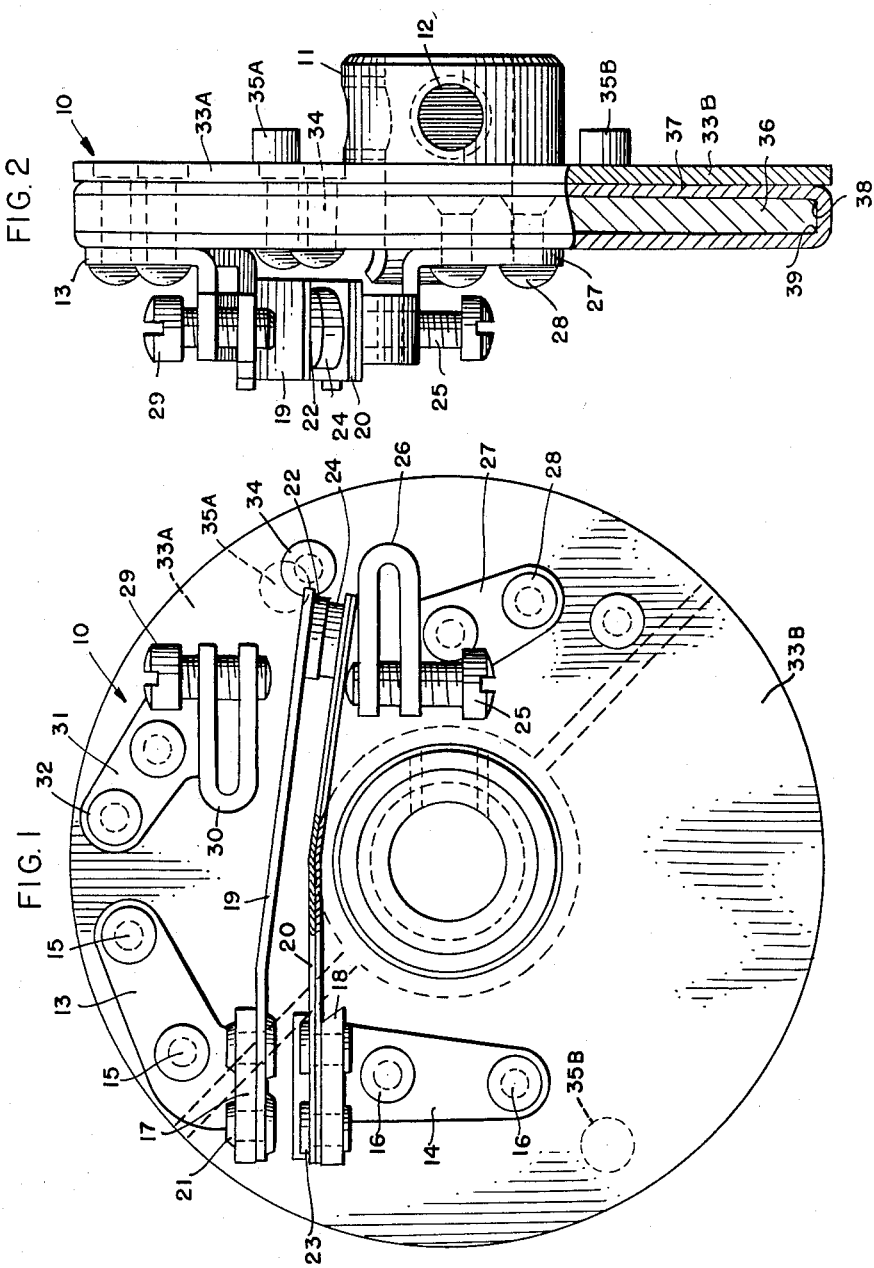

Jan. 12, 1960 F. HUNYADY, JR 2,921,156
GOVERNOR BODY

Filed Jan. 30, 1957 2 Sheets-Sheet 2

OLD

INVENTOR:
FRANK J. HUNYADY, JR.
BY
ATT'Y

United States Patent Office 2,921,156
Patented Jan. 12, 1960

2,921,156
GOVERNOR BODY
Frank Hunyady, Jr., Chicago, Ill., assignor to A-M Company, Chicago, Ill., a partnership
Application January 30, 1957, Serial No. 637,219
9 Claims. (Cl. 200—80)

This invention relates to a governor device useful in controlling the rotational velocity of electric motors, generators and the like, and more especially to a governor body or support and to a method of making the same. The governor body is particularly useful in governor devices actuated by centrifugal force.

There are many applications for the use of electric motors and similar devices wherein it is essential that the rotational velocity thereof be closely controlled and remain at a predetermied value. In order to afford speed control therefor, it is customary to provide governors operatively connected in circuit with the motors and responsive to the rotational velocity thereof to alter the condition of the circuit and thereby hold the speed close to a preselected value.

It is found, however, that the prior art governors at best function only to approximate the desired degree of control so that where exceptional accuracy in the control function is a requisite, complex and expensive control means are employed either in place of the conventional governor or in combination therewith, which of course is a disadvantage. One of the difficulties in providing a governor device operative to accurately control the rotational velocity of an electric motor is that the various components of the governor are made of different materials whereby temperature changes which are inherent in the operation of a motor or ambient temperature changes, distort the relative placement and mechanical interrelation of the governor components with the result that errors creep into the governor control function.

For example, a governor will ordinarily comprise a governor body or support carried by the shaft of the motor so as to be rotated thereby, and elements responsive to centrifugal force being mounted on the body through various brackets, rivets, etc. The various windings of the motor, the brushes, collection rings, etc. are all located behind one face or planar surface of the governor body, and the heat developed particularly through the friction of the brushes commences to heat the body as the motor operates. The governor body is formed of brass or other conductive metal, sheathed by plastic or like insulating materials all of which have different thermal coefficients of expansion, which causes warpage of the body. The heat developed is ultimately translated at least in part to the brackets and responsive elements which have thermal coefficients of expansion that differ from those of the composite governor body, and in no event do they compensate for the warpage that occurs in the body.

These difficulties need to be overcome in order to provide centrifugal governors that function to accurately control the rotational velocity of electric motors and the like, and overcoming the same is one of the objects of this invention. Another object of the invention is to provide a body or support structure for centrifugal governors, that is an integral unit having but one thermal coefficient of expansion whereby it does not warp when heated by operation of a motor in which it is incorporated. Still another object is that of providing an integral governor body formed of metal, that has inherently good electrical conductivity but which is sheathed by a form of the material itself to provide a body with exceptionally fine dielectric capacity.

Still a further object is in the provision of a centrifugal governor for use with electric motor and the like, which comprises a governor body adapted to be rotated by the motor and which provides a mounting for at least one deflectible control element that, in response to centrifugal force developed by rotation of the motor and body, deflects at a predetermined velocity to alter the condition of the motor circuit and thereby maintain the motor velocity at such predetermined value, the governor body being made of aluminum sheathed or having an integral coating of amorphous alumina thereon.

It has been found that aluminum may be provided with an integral coating of amorphous alumina, and when so coated the aluminum body has high dielectric capacity. For example, a coating of 0.0015 inch in thickness is able to withstand 1,200 volts without breakdown at 20 megohms resistance. The amorphous alumina coating may be developed on the aluminum body in a generally conventional electrolytic process wherein a refrigerated sulphuric acid electrolyte is used. However, when an aluminum body is so treated in such an electrolytic process, it is found that the anodic coating does not completely cover the body for it does not appear to take at any corners or edges that are relatively sharp.

For example, if a rectangular plate having openings or passages therethrough is subjected to an electrolytic coating process, it is found that the anodic coating developed therein does not cover the corners and edges of the plate, nor the sharp edges of the plate surface at the openings or passages therethrough. Thus, a plate having such a lack of coating at certain locations thereon would not be suitable for use as a governor body, for at such locations the body would have no or very little dielectric capacity. A number of locations of this type would be present in a governor body because of the numerous openings and passages therethrough necessary for hanging counter-weights thereon, in securing brackets thereto, etc.

I have found that an aluminum body may be totally sheathed in an anodic coating of amorphous alumina so as to provide the body with a uniform dielectric throughout by rounding slightly all of the edges and corners prior to insertion of the body into the electrolyte. Therefore, another object of this invention is to provide an aluminum body having a substantially uniform anodic coating of amorphous alumina thereover so that it will be especially suited for use as a governor body or support structure. Yet another object is in the provision of a method of so coating an aluminum body. A further object is in the provision of a body member and method of making the same, wherein all of the corners and relatively sharp edges of an aluminum body are rounded slightly, and the body then treated in an electrolyte to build up an anodic coating of amorphous alumina thereon whereby the entire body member including the passages or openings therethrough has a substantially uniform coating thereon, with the result that it has an excellent dielectric capacity throughout and is suitable for use in electrical applications requiring a good dielectric. Additional objects and advantages of the invention will become apparent as the specification develops.

An embodiment of the invention, both structurally and insofar as the method is concerned, is illustrated in the drawings, in which—

Figure 4:
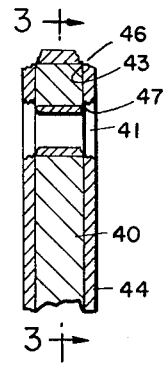
Figure 5:
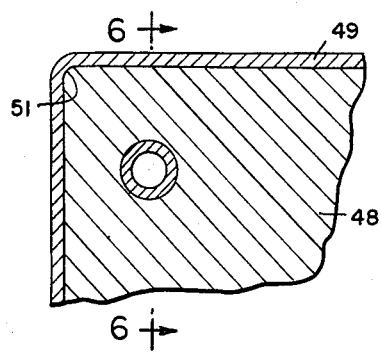
Figure 6:
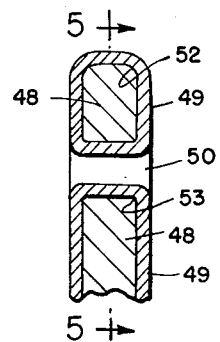

Figure 1 is an end view in elevation of a governor device employing the invention; Figure 2 is a side view in elevation of the device illustrated in Figure 1, and in which parts thereof are shown in section; Figures 3 and 4 are vertical sectional views taken respectively along the lines 3—3 of Figure 4 and 4—4 of Figure 3, and show an aluminum body having a conventional coating thereon; Figure 5 is a vertical sectional view taken along the line 5—5 of Figure 6, showing a body coated in accordance with the present invention; and Figure 6 is a vertical sectional view taken along the line 6—6 of Figure 5.

A centrifugal governor is illustrated in Figures 1 and 2, and includes a governor body or support 10 in the form of a cylindrical plate, and is provided centrally with an opening therethrough in which is mounted a hub 11 adapted to receive a motor shaft therein and to be constrained thereto by any suitable means, such as a set screw (not shown) which extends through a threaded bore 12 in the hub. Therefore, the body 10 will be rotated by the motor shaft. Mounted on the body 10 are generally L-shaped brackets 13 and 14, the base legs of which are secured to the body, respectively, by rivets 15 and 16. The outwardly extending legs 17 and 18 of the respective brackets are substantially normal to the face or planar surface of the body 10, and have secured thereto a pair of elongated deflection members 19 and 20. The deflectible response element 19 is anchored at one end to the leg 17 by rivets 21; and at its outer free end is equipped with a contact 22. Similarly, the deflectible response element 20 is secured adjacent one end to the leg 18 by rivets 23, and at its outer or free end is equipped with a contact 24.

The deflectible elements 19 and 20 extend in substantially parallel alignment so that the contacts 22 and 24 thereof are in engagement with each other in the position shown when the body 10 is at rest. However, these deflectible elements are offset from the rotational axis of the plate 10 and extend chordially thereacross so that they are influenced by centrifugal force developed during rotation of the body to deflect outwardly. The initial position of the elements is determined by an adjustable stop 25 in the form of a threaded screw extending through the U-shaped legs of a lock nut device 26 with which a bracket 27 is equipped. The bracket 27 is secured to the surface of the body 10 by rivets 28. The outward deflection of the members 19 and 20 is determined by an adjustable stop 29 also in the form of a threaded screw extending through the U-shaped legs of a locking device 30. The device 30 forms the outwardly extending leg of a generally L-shaped bracket 31 rigidly secured to the body 10 by rivets 32.

The body 10 will usually be equipped with counterweights to balance the various brackets and control elements, but for purposes of simplicity such counter-weight structures are not shown in that per se they form no part of this invention. The body 10 is seen in Figures 1 and 2 to have metal plates 33A and 33B secured to one side thereof by rivets 34. It will further be noted that certain of the rivets securing the mounting brackets to the body also anchor the plate 33 thereto. The semicircular plates 33A and 33B are spaced from one another as is shown in Figure 1. Moreover, the plates 33A and 33B are spaced from the hub 11 and electrically insulated from the motor shaft (not shown) and from each other by the dielectric coating 37 described below which covers the core 36. Plates 33A and 33B serve as current collectors against which the brushes 35A and 35B are urged by means (not shown). The brushes 35A and 35B riding on the collector plates 33A and 33B cause a substantial heat to develop because of the friction therebetween at the high rotational velocities of the plates and the body 10 which carry them. The brushes are, of course, adapted to be connected in the electric circuit of the device with which the governor is used.

In operation of the governor illustrated in Figures 1 and 2, and following the mounting of the hub 11 thereof to a motor shaft, the body 10 begins to rotate with such shaft. Initially, the contacts 22 and 24 are closed as shown, but when the body 10 attains a predetermined velocity, the element 19 flexes outwardly because of the influence of centrifugal force thereon, and the extent of its outward movement will depend upon the position of the stop 29 which it engages. Thereafter, at such predetermined rotational velocity and through a predetermined range of velocities thereabove, the contacts 22 and 24 will be opened.

As the velocity of the body 10 commences to increase above such predetermined range, a value is reached at which the control element 20 flexes outwardly under the influence of the increased centrifugal force thereon to bring the contact 24 into engagement with the contact 22. The contacts 22 and 24 are, as has been stated hereinbefore, connected in the motor circuit so as to change the condition thereof—or, more specifically, the current flow therethrough—and thereby regulate the motor velocity. After this higher predetermined value is reached at which the element 20 flexes outwardly, it will flex in and out in accordance with changes in velocity of the body 10 to open and close the contacts 22 and 24 at this predetermined value.

As is seen in Figure 2, the body 10 comprises an inner core 36 having a sheath or coating 37 completely enclosing the same. This sheath is also seen to extend through the openings or passageways in the body that pass the various rivets therethrough. Thus, the body in its entirety is enclosed in the sheath or coating 37. It should be noted that the core 36 is broken or rounded as at 38 (along the circumferential edges thereof) and also at 39 (at the ends or termini of the passages therethrough), and the sheath 37 tends to follow or conform to the rounded configuration of these edges.

Figures 3 and 4 illustrate the character of a coating or sheath of the usual type built upon a body 40. The body 40 in the illustration of Figures 3 and 4 is seen to have a passage or bore 41 therethrough, and has sharp corners 42 and sharp edges 43. The body 40 is provided with a coating 44 thereabout, but this coating is interrupted as at 45 adjacent the sharp corner 42, and at 46 and 47 where the coating is adjacent the sharp edges of the body and of the passage 41 therethrough, respectively. Thus, the body is not completely enclosed in a sheath, for that sheath is interrupted at various locations.

Figures 5 and 6, on the other hand, show a body 48 having a coating or sheath 49 thereon. The body 48 is seen to have a passage 50 therethrough, and the sheath completely encloses the edges of the body that define the passages 50. In order to achieve this result, the corners 51 of the body are rounded as are the peripheral edges 52, and edges 53 adjacent the opening 50. Thus, the body 48 has a continuous sheath thereover.

The body 40 of Figures 3 and 4, the body 48 of Figures 5 and 6, and also the body 10 of the governor structure illustrated in Figures 1 and 2 (that is, the core 36 of the governor body), are formed of aluminum; and the respective sheaths or coatings thereabout are integral therewith and comprise amorphous alumina built thereon as the anodal coating in an electrolytic process which may employ refrigerated sulphuric acid as the electrolyte. Since the coating process in that respect is of the type known in the art, no further elaboration thereon is believed necessary.

The amorphous alumina has a high dielectric capacity and therefore forms an insulation about the aluminum core or body which, as is well known, is an excellent electric conductor. Since this insulating dielectric is continuous and uninterrupted when built upon the body subsequent to the rounding of the corners thereof, the resultant sheath body is adapted for use in electrical applications requiring such characteristics, as the centrifugal governor body. Thus, in providing the totally sheathed body, the aluminum core first has all of the relatively sharp corners and edges thereof broken or rounded, and it is thereafter subjected to an electrolytic treatment.

It is seen now in referring to Figure 2 that the governor body 10 is an integral member comprising the aluminum core 36 and amorphous alumina sheath 37 totally enclosing the same. Therefore, when the body is heated as, for example, by the frictional resistance of the brushes 35 riding on the collector plate 33 carried by the body 10, the body expands uniformly as heated, for it has but a single thermal coefficient of expansion throughout its entirety. Therefore, there is no warpage of the body which would adversely influence the control function of the deflectible sensitive elements 19 and 20, and far superior governor regulation is achieved than in prior art structures.

While in the foregoing specification an embodiment of the invention has been described in considerable detail both in its structural and method aspects for purposes of making a complete disclosure thereof, it will be apparent to those skilled in the art that numerous changes may be made in those details without departing from the spirit and scope of the invention.

I claim:

1. In a centrifugally actuated governor adapted for use in controlling the rotational velocity of electric motors and the like, a governor body adapted to be rotatably driven, a pair of contacts adapted to be opened and closed, and a centrifugally actuated speed responsive element secured to said body and to one of said contacts and being operative in response to charges in the velocity of said body from a predetermined value to selectively open and close said contacts and thereby maintain the velocity of the body at that value, said governor body being metal throughout and having a core of aluminum in which substantially all of the corners and edges are rounded and is substantially enclosed in its entirely with an integral oxide coating of aluminum comprising an anodic coating of amorphous alumina characterized by a relatively high dielectric capacity.

2. In a governor for controlling the rotational velocity of electric motors and the like, a governor body adapted to be rotated about a predetermined axis, and including a metal core having mounting holes therethrough whose edges are rounded and a sheath integral therewith of relatively high dielectric capacity covering said rounded edges, the walls of said holes and the surfaces bordering said holes, a pair of contacts, means for supporting said contacts in operative position including bracket elements engaging said bordering surfaces and metal members extending through said holes securing said bracket elements in place, one of said contacts being supported on said body in a predetermined position with respect thereto by one of the brackets a centrifugally responsive element supported by another of said brackets on said body and oriented so as to be responsive to centrifugal force developed during rotation thereof, the other of said contacts being carried by said responsive element for selective engagement with the aforesaid one contact.

3. In a centrifugal governor of the character described, a rotatable governor body having an aluminum core with apertures therethrough and its curves and edges rounded and enclosed by a sheath of amorphous alumina, a control responsive metal element resting adjacent one end thereof against said sheath and being oriented thereon so as to be deflected when said body is rotated, a metal support element resting against said sheath at a point spaced electrically from said responsive element, a pair of switch contacts carried by said elements to cooperate with each other, a pair of electrically spaced collector members resting against said sheath, and electrically conductive elements interconnecting each of said elements and members through said apertures in supported relation upon said body.

4. In a centrifugally actuated governor adapted for use in controlling the rotational velocity of electric motors and the like, a governor body adapted to be rotatably driven, a pair of contacts adapted to be opened and closed, and a centrifugally actuated speed responsive element secured to said body at said opening and to one of said contacts and being operative in response to changes in the velocity of said body from a predetermined value to selectively open and close said contacts and thereby maintain the velocity of the body at that value, said governor body being metal throughout and having a core of high heat conductivity with all working corners and edges rounded and substantially enclosed with an integral sheath of an oxide of said metal characterized by a relatively high dielectric capacity.

5. In a centrifugally actuated governor adapted for use in controlling the velocity of electric motors and the like by changing the relationship between a pair of contacts when the velocity of such motor tends to exceed a predetermined value, a governor body having substantially all of its corners and edges rounded, and a deflectible speed responsive element adapted to carry one of such contacts and to be mounted on said governor body so as to be influenced by centrifugal force upon the rotation thereof for changing the relationship between the contacts, said governor body having a single coefficient of heat expansion and being formed of a metal having a high thermal and electrical conductivity and having an integral coating of an oxide of that metal characterized by having relatively high dielectric capacity.

6. In a structure of the character described, a governor body adapted to be rotatably driven by the shaft of a motor or the like, said body also being adapted to carry centrifugally responsive deflection elements, said body comprising a central core of aluminum with all corners and edges rounded and an anodic coating of amorphous alumina integral therewith and affording a sheath for the core of relatively high dielectric capacity.

7. A unitary governor body of the character described, comprising an annular flat core of aluminum having substantially all corners and edges thereof rounded and a sheath of amorphous alumina enclosing the same and being uninterrupted at the rounded edges, said sheath being characterized by an anodic coating of amorphous alumina having a relatively high dielectric capacity.

8. A body member adapted for use in electrical applications where a relatively high dielectric capacity is required, comprising an aluminum core having at least one opening therethrough, said core having rounded edges defining the terminii of said opening, and an anodic oxide coating of amorphous alumina integral with said core and encapsulating the same, said coating having a substantially uniform thickness throughout and being unbroken at the rounded edges of said core.

9. In a method of making governor bodies and the like from metal having a high thermal and electrical conductivity for use in applications where a relatively high dielectric capacity therefor is required, the steps of aperturing an aluminum core and rounding substantially all the edges thereof, and building up an anodic coating of oxidized amorphous alumina on said core to a substantially uniform and uninterrupted thickness over said edges.

References Cited in the file of this patent

UNITED STATES PATENTS

| | | |
|---|---|---|
| 835,327 | Rupley | Nov. 6, 1906 |
| 1,829,237 | Ruben | Oct. 27, 1931 |
| 2,235,481 | Hennig et al. | Mar. 18, 1941 |
| 2,291,165 | Lyons | July 28, 1942 |
| 2,357,906 | Osterheld | Sept. 12, 1944 |
| 2,368,771 | Osterheld | Feb. 6, 1945 |
| 2,578,400 | Cohn | Dec. 11, 1951 |
| 2,767,272 | Nader | Oct. 16, 1956 |